United States Patent [19]

Sirianno

[11] Patent Number: 5,035,760

[45] Date of Patent: Jul. 30, 1991

[54] METHOD OF INDICATING A LOCATION

[76] Inventor: James P. Sirianno, R.D. #6, Buffalo St. Ext., Jamestown, N.Y. 14701

[21] Appl. No.: 456,524

[22] Filed: Dec. 26, 1989

[51] Int. Cl.[5] .......................... B44F 1/00; B32B 31/00

[52] U.S. Cl. ........................................ 156/67; 156/71; 156/249; 156/273.1; 40/312

[58] Field of Search .......................... 40/312, 594, 595; 156/71, 273.1, 67, 249; 428/40, 41, 42; 206/831; 283/86, 101

[56] References Cited

U.S. PATENT DOCUMENTS

| | | | |
|---|---|---|---|
| 307,034 | 10/1889 | Elliott . | |
| 945,349 | 1/1910 | Tatham . | |
| 1,116,043 | 11/1914 | Elliott . | |
| 1,148,233 | 7/1915 | Jefferson . | |
| 1,272,394 | 7/1918 | Devney . | |
| 1,372,604 | 3/1921 | Couture . | |
| 1,829,005 | 10/1931 | Kalnitz . | |
| 1,853,622 | 4/1932 | Kennedy . | |
| 1,984,559 | 12/1934 | Wilcox | 229/74 |
| 2,064,060 | 12/1936 | Frenkel | 41/22 |
| 2,222,166 | 11/1940 | Beline | 116/135 |
| 3,417,861 | 12/1968 | Levy | 206/45 |
| 3,967,022 | 6/1976 | Hasei | 156/273.1 |
| 4,042,110 | 8/1977 | Guernsey | 206/459 |
| 4,108,350 | 8/1978 | Forbes, Jr. | 229/37 |
| 4,176,484 | 12/1979 | Terris | 40/584 |
| 4,216,598 | 8/1980 | Newbert | 40/331 |
| 4,225,369 | 9/1980 | Felchlin | 156/71 |
| 4,232,816 | 11/1980 | Johnson et al. | 229/33 |
| 4,275,112 | 6/1981 | Savage, Jr. | 156/71 |
| 4,557,971 | 12/1985 | Williams | 428/40 |
| 4,859,512 | 8/1989 | Jones et al. | 156/249 |

OTHER PUBLICATIONS

Advertising literature, Super Signs, Inc., 108 Pomona Dr., Greensboro, NC 27407.

*Primary Examiner*—David A. Simmons
*Assistant Examiner*—Chester T. Barry
*Attorney, Agent, or Firm*—Wayne L. Lovercheck; Charles L. Lovercheck; Dale Lovercheck

[57] ABSTRACT

A delivery signal system and device and method of delivery indication to indicate the location for a delivery to be made. The delivery signal device includes a polymeric transparent film having indicia thereon. Adhesive holds the delivery signal device to a delivery container. In a preferred embodiment of the invention the delivery signal device includes a paper backing and a polymeric transparent film having an electrostatic charge and indicia thereon formed by a luminescent coating. The electrostatic charge is effective to hold the polymeric transparent film and paper backing together. Adhesive holds the paper backing of the delivery signal device to a delivery container. A release coating on the paper backing on the side facing the adhesive allows the delivery signal device to be readily separable from the delivery container. In use the delivery signal device is removed from the delivery container, and the delivery container is discarded. When a subsequent delivery is to be made the transparent film is removed from the backing and positioned on a planar glass window on an exterior room wall facing the thoroughfare from which the delivery is to be made. Exterior lights are turned off, and a light source inside the room is turned on to back light the transparent film. Back lighting from the light source makes the indicia on the transparent film readily visible at night to the delivery person in the vehicle from which the subsequent delivery container is to be delivered.

9 Claims, 5 Drawing Sheets

METHOD OF INDICATING A LOCATION

BACKGROUND OF THE INVENTION

The invention relates to a delivery signal system and device and method of delivery indication. The invention provides an improved delivery signal device which includes a polymeric transparent film and a paper backing. The film has an electrostatic charge thereon and supports luminescent indicia. The delivery signal device is used to indicate the location for subsequent deliveries to be made. After an initial delivery the film is removed from a first container enclosing the item delivered. When a subsequent delivery of a second container is to be made the film is positioned on a planar glass window on an exterior wall facing the street from which the delivery is to be made.

The improvements of the invention each taken alone or in combination resolve the problems of the prior art. One problem of the prior art is the lack of a delivery signal device which is adapted to be removed from a package and then positioned on a window to identify the location for a delivery to be made. Another problem of the prior art is lack of a delivery signal system and device which is adapted to be night visible and to promote faster deliveries of products, such as pizzas, which will increase customer satisfaction and improve repeat business.

Frenkel in U.S. Pat. No. 2,064,060 discloses a device which is affixed to its mounting surface by an adhesive such as a glue or a paste. Elliott in U.S. Pat. Nos. 307,034 and 1,116,043, Jefferson in U.S. Pat. No. 1,148,233, Kalnitz in U.S. Pat. No. 1,829,005, Guernsey in U.S. Pat. No. 4,042,110 and Forbes in U.S. Pat. No. 4,108,350 each disclose a carton having a removable or folding portion. The removable portion of Elliott, Kalnitz and Guernsey are neither transparent nor adapted to be subsequently affixed to a window as is the delivery signal device of the present invention. The removable or folding portion of Jefferson and Forbes are not transparent. Beline in U.S. Pat. No. 2,222,166 and Wilcox in U.S. Pat. No. 1,984,559, Kennedy in U.S. Pat. No. 1,853,622, Newbert in U.S. Pat. No. 4,216,598, and Devney in U.S. Pat. No. 1,272,394 disclose printed members to be supported by door knobs. Johnson et. al. in U.S. Pat. No. 4,232,816 discloses a clamshell type carton. Terris in U.S. Pat. No. 4,176,484 discloses a directional sign. Couture in U.S. Pat. No. 1,372,604 discloses a watch repair box. Levy in U.S. Pat. No. 3,417,861 discloses a display container. Tatham in U.S. Pat. No. 945,349 discloses a mailing box. The prior art does not disclose a delivery signal system or device which includes a transparent film which is adapted to be removed from a package and then positioned on a window to identify the location for a delivery to be made as is provided in accordance with the present invention.

OBJECTS OF THE INVENTION

It is an object of the invention to provide a delivery signal device and system in which a container supports a backing member held by an electrostatic charge to a transparent film having indicia thereon.

It is another object of the invention to provide a delivery indication method which provides a device which includes a transparent film held to a container by an electrostatic charge.

It is another object of the invention to provide a method of delivery indication using a device which includes a transparent film adhered to a container wherein the film is removed from the container and positioned and positioned on a glass window.

Fluorescence is the quality in some transparent substances of colored luminosity. Preferably, transparent colored fluorescent substances are used to form the indicia on the transparent film of the delivery signal device in accordance with the present invention. At night light passing through indicia has a fluorescent appearance. During day time sun light reflecting from fluorescent indicia also has a fluorescent appearance. In a preferred embodiment of the invention the indicia glow in the dark and may include phosphor.

The improvements of the present invention beneficially provide a novel, non-obvious and useful device which is adapted to be removed from a package and then applied to a window to identify the location for a delivery to be made.

BRIEF DESCRIPTION OF THE INVENTION

A delivery signal system and device and method of delivery indication to indicate is disclosed the location for a delivery to be made. The delivery signal device includes a polymeric transparent film having indicia thereon. Adhesive holds the delivery signal device to a delivery container. In a preferred embodiment of the invention the delivery signal device includes a paper backing and a polymeric transparent film having an electrostatic charge and indicia thereon formed by a luminescent coating. The electrostatic charge is effective to hold the polymeric transparent film and paper backing together. Adhesive holds the paper backing of the delivery signal device to a delivery container. A release coating on the paper backing on the side facing the adhesive allows the delivery signal device to be readily separable from the delivery container. In use the delivery signal device is removed from the delivery container, and the delivery container is discarded. When a subsequent delivery is to be made the transparent film is removed from the backing and positioned on a planar glass window on an exterior room wall facing the thoroughfare from which the delivery is to be made. Exterior lights are turned off, and a light source inside the room is turned on to back light the transparent film. Back lighting from the light source makes the indicia on the transparent film readily visible at night to the delivery person in the vehicle from which the subsequent delivery container is to be delivered.

BRIEF DESCRIPTION OF THE DRAWINGS

The objects features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
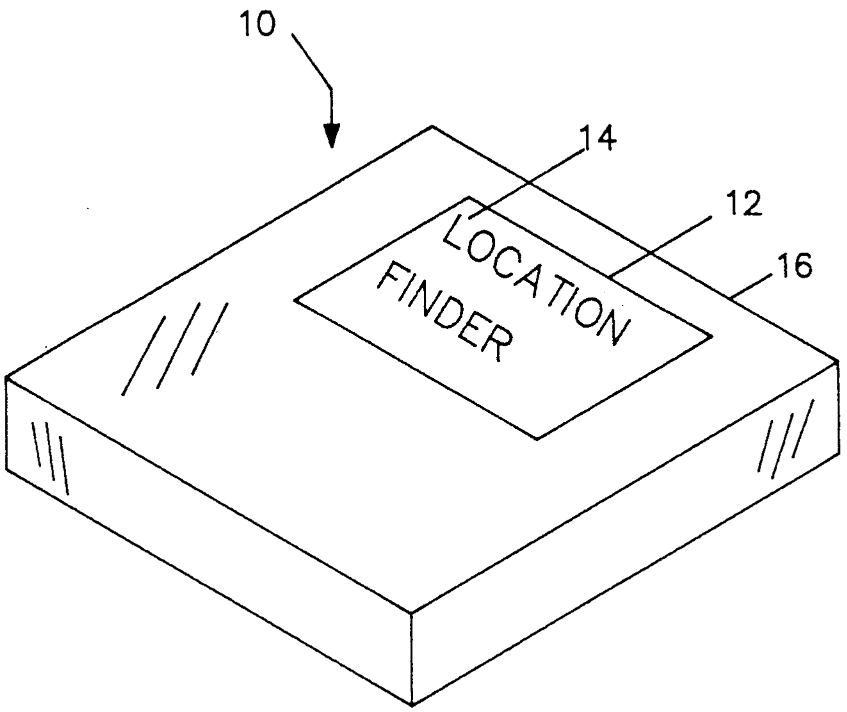
FIG. 1 is a perspective view of a delivery signal system in accordance with the invention.

The preferred embodiment of the invention is illustrated by way of example in FIGS. 1 through 5. Referring to the Figures, in which like numerals refer to like portions thereof FIG. 1 shows a system 10 for distributing a delivery signal device in accordance with the present invention. System 10 includes delivery signal device 12 having location indicia 14 thereon connected to delivery container 16. System 10 is delivered to a delivery location. Delivery signal device 12 is removed from delivery container 16 and stored for use in subsequent delivery location finding.

Figure 2:
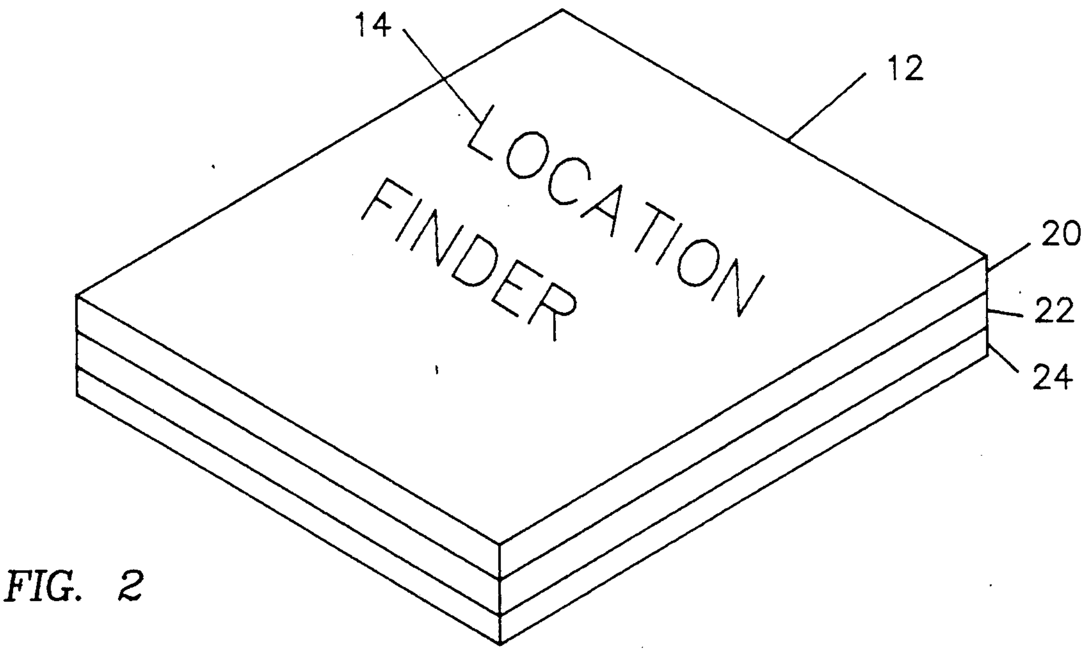
FIG. 2 is a perspective view of a delivery signal device in accordance with the invention.

With more particular reference to FIG. 2 it is seen that delivery signal device 12 includes transparent film 20 having location indicia 14 thereon and coated paper backing 22 having adhesive layer 24 thereon. The adhesive of adhesive layer 24 is any adhesive suitable for bonding paper backing 22 to delivery container 16. Suitable adhesives include inorganic and organic natural and synthetic bonding agents, such as, cements and resins. Preferably, a pressure sensitive adhesive is used, such as, a rubber based adhesive, for example a mixture of rubber, filler and tackifier.

Transparent film 20 carries an electrostatic charge which holds it to coated paper backing 22. Preferably transparent film 20 is a polymeric film. More preferably, transparent film 20 is a thermoplastic polymer such as polyvinyl chloride or polyvinyl acetate.

Figure 2A:
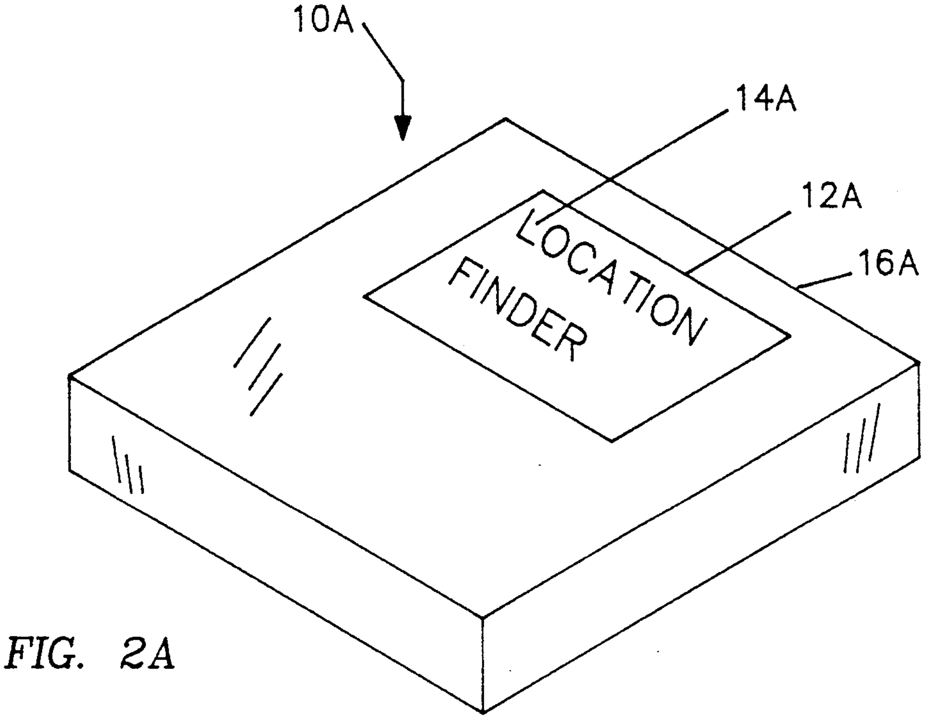
FIG. 2A is a perspective view of a delivery signal system in accordance with the invention.
Figure 2B:
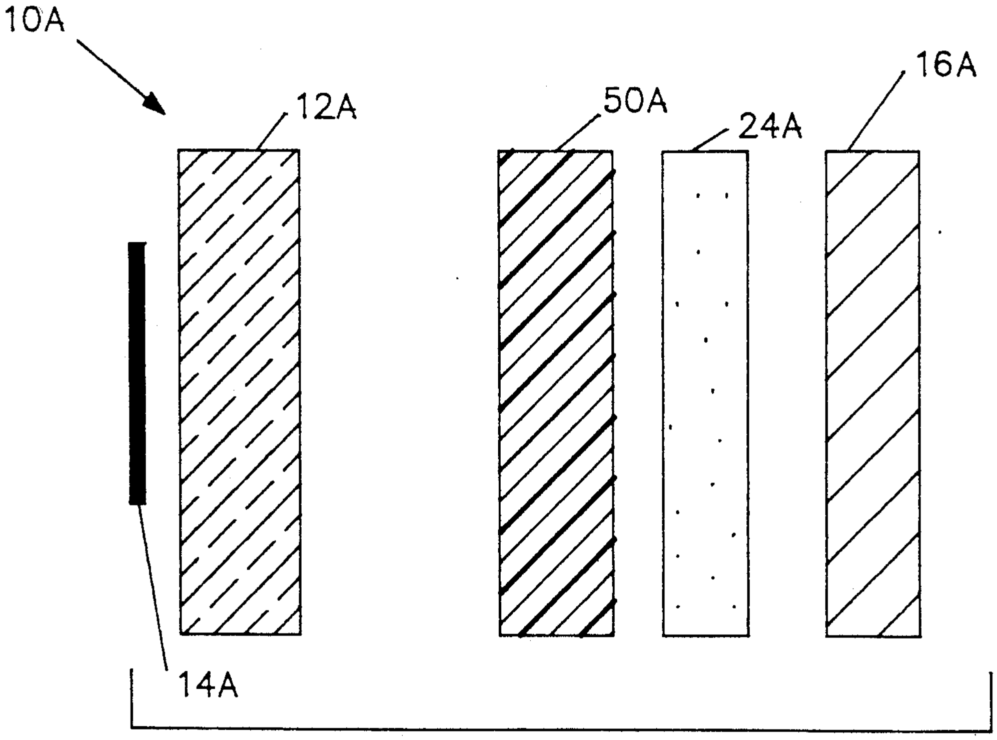
FIG. 2B is an exploded cross-sectional side view of a delivery signal system in accordance with the invention.

As seen in the preferred embodiment of the invention shown in FIGS. 2A and 2B delivery signal system 10A includes transparent film 12A having indicia 14A and release coating 50A thereon, and paper board container having container top 16A with adhesive layer 24A thereon. Indicia 14A are supported on transparent film 12A which has an electrostatic charge thereon. Release coating 50A permits transparent film 12A to be readily removable from adhesive layer 24A on paper board container top 16A. Preferably transparent film 12A is a polymeric film. More preferably, transparent film 12A is a thermoplastic polymer. Preferably, a pressure sensitive adhesive is used for adhesive layer 24A, such as, a rubber based adhesive, for example a mixture of rubber, filler and tackifier.

Figure 2C:
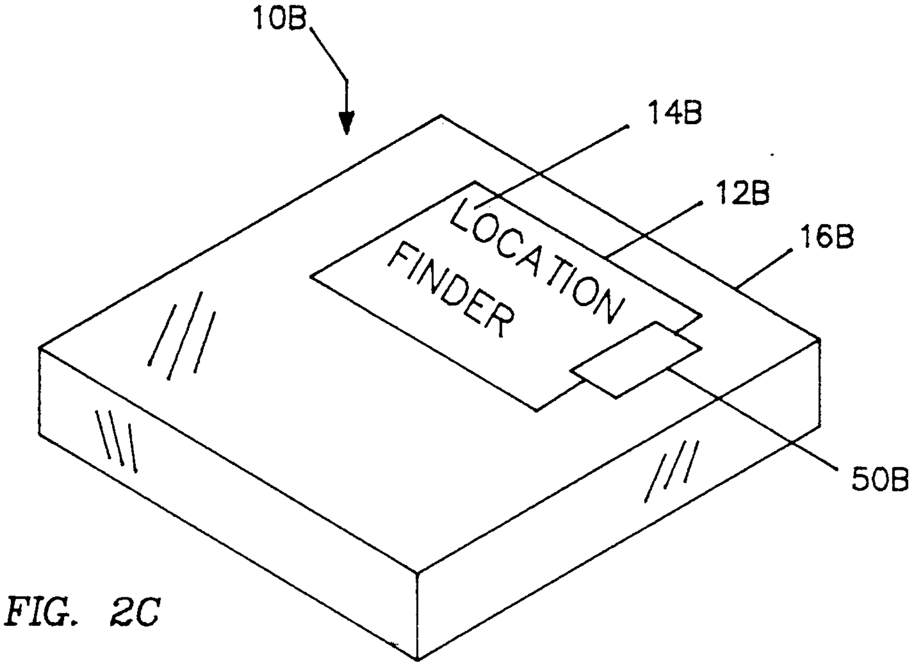
FIG. 2C is a perspective view of a delivery signal system in accordance with the invention.
Figure 2D:
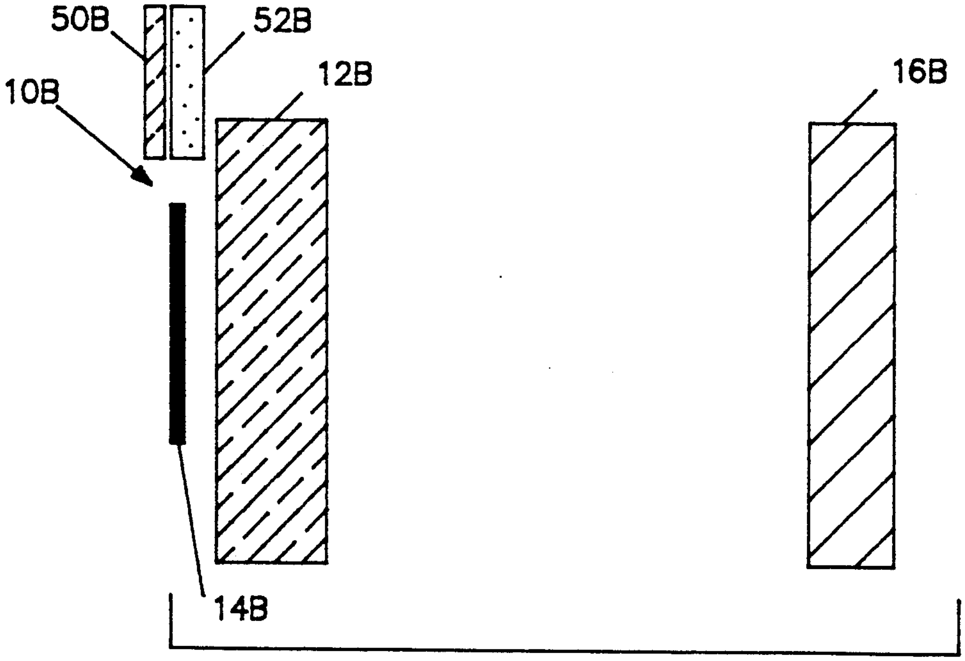
FIG. 2D is an exploded cross-sectional side view of a delivery signal system in accordance with the invention.

As seen in the preferred embodiment of the invention shown in FIGS. 2C and 2D delivery signal system 10B includes transparent film 12B having indicia 14B thereon, a paper board container having container top 16B, and adhesive tape 50B having adhesive 52B thereon. Indicia 14B are supported on transparent film 12B. Adhesive tape 50B holds transparent film 12B to paper board container top 16B. Preferably transparent film 12B is a polymeric film. More preferably, transparent film 12B is a thermoplastic polymer.

Figure 3:
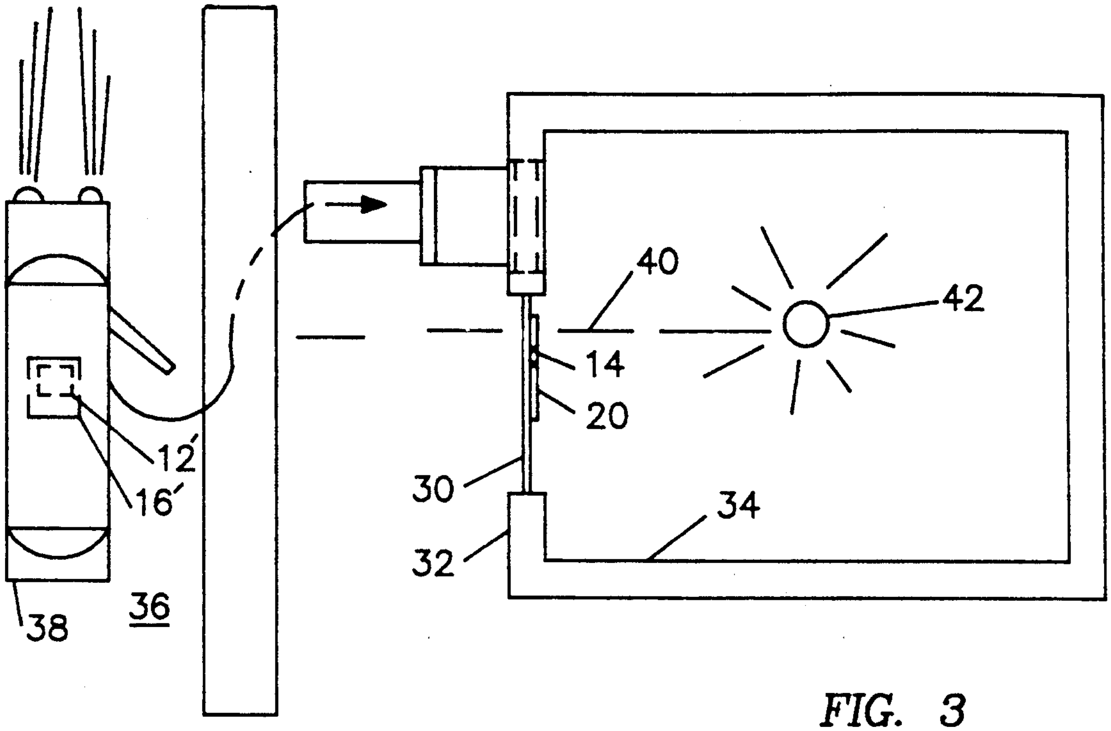
FIG. 3 is a top view of a delivery signal device supported by a window in accordance with the invention.

With more particular reference to FIG. 3 it is seen that delivery signal device 12 having location indicia 14 thereon is positioned on window 30 of exterior wall 32 of room 34. Window 30 faces the thoroughfare 36 from which delivery container 16' having delivery signal device 12' thereon is to be delivered from vehicle 38. Light 40 from light source 42 travels through transparent film 20 and window 30 and is readily visible at night to the delivery person in vehicle 38. Light 40 back lights the indicia on transparent film 20 in window 30. The electrostatic charge on transparent film 20 holds it to window 30.

In use, transparent film 20 is separated from coated paper backing 22. Transparent film 20 is then applied to window 30. Back lighting from light source 42 makes the indicia on transparent film 20 readily visible at night to the delivery person in vehicle 38 from which delivery container 16' having delivery signal device 12' is to be delivered.

The user readily removes transparent film 20 from coated paper backing 22 and applies it to window 30. Transparent film 20 is held in turn to coated paper backing 22 and to window 30 by an electrostatic charge. Neither the side of paper backing 22 facing transparent film 20 nor window 30 have an adhesive thereon. Thus, the removal and application of transparent film 20 are accomplished without tearing transparent film 20 from an adhesive, or addition of an adhesive.

Transparent film 20 may be any desired shape or size. Alternatively, film 20 may be clear, fluorescent or any desired color. Film 20 may be any desired thickness. Preferably, film 20 is from about one millimeter to about 81 millimeters thick. Colors take on a fluorescent effect when back lighted. Colors may be screened to the film. Alternatively, colors may be impregnated into the film.

Coated paper backing 22 is protected on one side from dirt and debris by a protective layer or coating, such as wax. The other side of coated paper backing 22 is not coated so that it is readily affixed to delivery container 16, for example by an adhesive. Similarly, the side of transparent film 20 having the electrostatic charge is preferably provided with a protective layer or coating, such as wax to protect it from dirt and debris and to prevent it from being damaged when it is removed from coated paper backing 22.

In use, delivery container 16 may contain a pizza to be delivered. When a first pizza is delivered in delivery container 16, transparent film 20 and coated paper backing 22 are removed as a unit from delivery container 16. When a second pizza is to be delivered transparent film 20 is removed from coated paper backing 22 and positioned in window 30 where it is back lighted by light 42 and visible to the operator of delivery vehicle 38. Any exterior lights on exterior wall 32 are turned off. The light passing through fluorescent indicia has a "neon" appearance to the operator of delivery vehicle 38. During day time sun light reflecting from fluorescent indicia also has a "neon" appearance to the operator of delivery vehicle 38.

Figure 4:
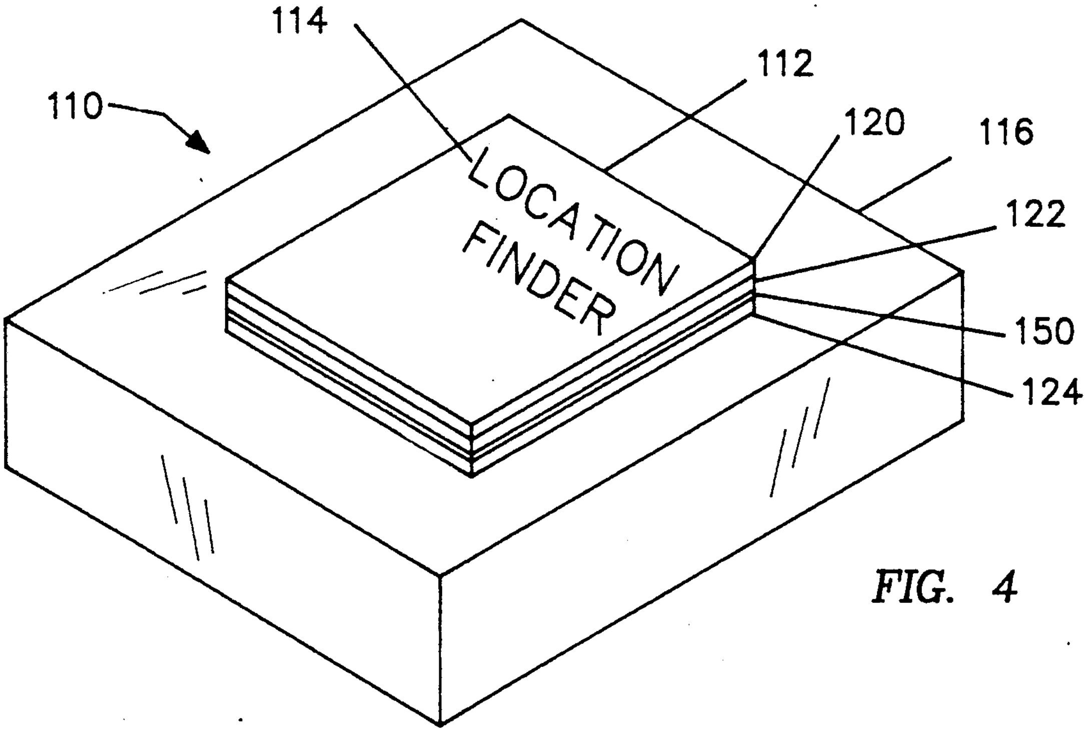
FIG. 4 is a perspective view of a delivery signal system in accordance with the invention.
Figure 5:
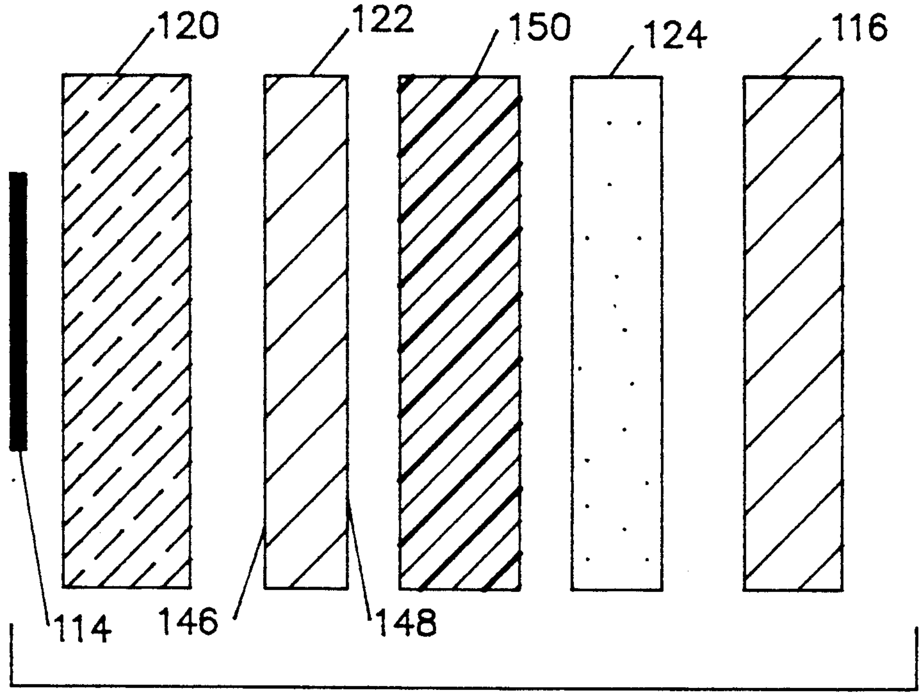
FIG. 5 is an exploded cross-sectional side view of a delivery signal system in accordance with the invention.

With more particular reference to FIGS. 4 and 5 a preferred embodiment of delivery signal system 110 in accordance with the invention is seen. FIG. 5 is an exploded cross-sectional side view of delivery signal system 110. System 110 includes delivery signal device 112 having location indicia 114 thereon connected to delivery container 116. Delivery signal device 112 includes transparent film 120, coated paper backing 122 and adhesive layer 124. Transparent film 120 carries an electrostatic charge which holds it to coated paper backing 122. Preferably transparent film 120 is a polymeric film. More preferably, transparent film 120 is a thermoplastic polymer.

Side 148 of coated paper backing 122 adjacent to adhesive layer 124 is provided with release coating 150, such as, silicone. Preferably, release coating 150 includes a solid or semisolid organosiloxane polymer. Release coating 150 allows coated paper backing 122 and film 120 to be readily removed as a unit from adhesive layer 124 affixing delivery signal device 112 to delivery container 116. The electrostatic charge on transparent film 120 holds it to coated paper backing 122. Film 120 and backing 122 are stored until a subsequent delivery is to be made. When a subsequent delivery is to be made film 120 is removed from backing 122 and positioned on a window of an exterior wall of a room. The electrostatic charge on film 120 holds it to a window. The window faces the thoroughfare from which a subsequent delivery container having a delivery signal device thereon is to be delivered. Exterior lights are turned off. Light from a light source inside the room travels through transparent film 120 and the window and is readily visible at night to the delivery person.

While the present invention has been disclosed in connection with the preferred embodiment thereof, it should be understood that there may be other embodiments which fall within the spirit and scope of the invention as defined by the following claims.

What is claimed is:

1. A method of using a film to indicate a delivery location comprising the steps of:

releasably affixing said film having indicia thereon to an exterior surface of a first container to be delivered;

delivering the first container to said delivery location;

detaching said film from the first container;

affixing said film to a planar glass member; and subsequently delivering a second container to said delivery location.

2. The method of claim 1 wherein said planar glass member is a window in an exterior wall of a room provided with illumination.

3. The method of claim 1 wherein said film has an electrostatic charge thereon and said affixing step comprises electrostatically adhering said film to said planar glass member.

4. The method of claim 2 wherein the second container is delivered at night from a thoroughfare adjacent said room and said illumination renders said film visible from said thoroughfare.

5. The method of claim 1 wherein said indicia comprise a luminescent coating.

6. The method of claim 3 wherein the step of releasably affixing said film to the first container comprises releasably affixing said film to a backing member and affixing said backing member to said exterior surface of said first container.

7. The method of claim 6 wherein said backing member is adhered to said first delivery container and said film is electrostatically adhered to said backing film.

8. The method of claim 7 wherein said first container comprises an adhesive and said backing member is adhered to said adhesive.

9. The method of claim 8 wherein said backing member comprises a release coating on its face adjacent to said adhesive.

* * * * *